United States Patent
Zabel et al.

(10) Patent No.: US 9,510,497 B2
(45) Date of Patent: Dec. 6, 2016

(54) AERATOR WITH ACTIVE TURF CALIBRATION OF GROUND SENSOR

(71) Applicant: DEERE & COMPANY, Moline, IL (US)

(72) Inventors: Loren A Zabel, Raleigh, NC (US); Marquez Perkins, Charlotte, NC (US); Stanley K. Hall, Godwin, NC (US); Zackary P Sipper, Willow Spring, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/171,139

(22) Filed: Feb. 3, 2014

(65) Prior Publication Data
US 2015/0216101 A1    Aug. 6, 2015

(51) Int. Cl.
*A01B 45/02* (2006.01)
*A01B 71/02* (2006.01)

(52) U.S. Cl.
CPC ............. *A01B 45/023* (2013.01); *A01B 71/02* (2013.01)

(58) Field of Classification Search
CPC ....... A01B 45/00; A01B 45/02; A01B 45/023; A01B 71/02
See application file for complete search history.

(56) References Cited

U.S. PATENT DOCUMENTS

| 4,566,543 | A | | 1/1986 | Kotani |
| 5,309,699 | A | | 5/1994 | Ehn, Jr. |
| 5,551,518 | A | * | 9/1996 | Stratton .................. 172/4.5 |
| 5,984,420 | A | * | 11/1999 | Murray et al. .............. 299/1.5 |
| 7,293,612 | B1 | | 11/2007 | Petersen et al. |
| 8,255,126 | B2 | | 8/2012 | Hunt et al. |
| 2008/0257571 | A1 | | 10/2008 | Keane et al. |
| 2010/0018726 | A1 | * | 1/2010 | Chiocco ..................... 172/1 |
| 2010/0186360 | A1 | | 7/2010 | Keski-Luopa |
| 2011/0213530 | A1 | | 9/2011 | Hunt et al. |

FOREIGN PATENT DOCUMENTS

JP    H0984411 A    3/1997

OTHER PUBLICATIONS

Search Report issued in counterpart application No. GB1500920.2, dated Jul. 10, 2015 (3 pages).
German Search Report issued in counterpart application No. 102015201095.3, dated Feb. 26, 2016 (7 pages).

* cited by examiner

*Primary Examiner* — Jamie L McGowan

(57) ABSTRACT

An aerator with active turf calibration of a ground sensor that provides signals to a controller relating to changes in slope of a ground surface. The controller adjusts the position of a coring head based on signals from the ground sensor. The controller determines an offset from a neutral position of the ground sensor based on signals from the ground sensor on a flat surface during aeration compared to the neutral position of the ground sensor on a flat surface from static calibration.

10 Claims, 3 Drawing Sheets

AERATOR WITH ACTIVE TURF CALIBRATION OF GROUND SENSOR

FIELD OF THE INVENTION

This invention relates to aerators for aerating ground surfaces. More specifically, the invention relates to walk-behind aerators having coring heads with a plurality of tines that repeatedly penetrate the ground surface.

BACKGROUND OF THE INVENTION

Aerators are commonly used for maintaining landscaped ground surfaces including turf. The term "turf" refers to grass and other material which is specifically grown for sporting activities and is used, for example, to form golf course greens. Aerators on these types of surfaces have a coring head with tines that repeatedly penetrate the ground surface, forming a plurality of holes so that the ground surface is aerated, to improve growth of the grass or other material and enhance the condition of the surface for playing purposes.

In conducting this type of aeration of turf surfaces, the neatness of the holes made by the aerator tines can significantly affect the overall result. For example, in the case of golf greens and the like where the vegetation is short, a hole with rough edges or too large a hole can cause spot erosion, resulting in an undesirable dimple in the ground surface. This effect is aggravated when forward movement of the aerator differs from the speed of the coring head over the ground surface, causing the tines to rake across or break the ground surface.

To minimize rough edges of the holes, aerators may be designed to keep the tines substantially vertical for entry and withdrawal from horizontal ground surfaces. For example, aerators may have flywheels that drive the upper ends of tine supports in a circular path, and the lower ends in a reciprocating motion of repeated penetrations into the ground. Link arms can pivot to compensate for forward motion of the machine. At each part of the cycle when the tines are withdrawn from the ground surface, the link arms may position the tines in a substantially vertical position for the next cycle of penetration into the ground. Tines are generally cylindrical, are hollow or solid, and produce holes by pulling up plugs or cylindrical cores of soil as the tines move by rotation of the flywheel.

Holes produced by aerator tines may be substantially vertical, and perpendicular to ground surfaces, when ground surfaces are horizontal. However, the holes may not be perpendicular due to undulating or sloped surfaces. For example, golf courses may have undulations or steep slopes in need of aeration. While an aerator travels over undulations or slopes, the coring head may not be perpendicular to the ground surface and, as a result, the tines may enter and/or exit the ground at angles that are not perpendicular to the ground surface. As a result, the holes are not perpendicular to the ground surface, and may have rough edges and be subject to erosion. Additionally, if the tines are not perpendicular to the ground surface, they do not provide uniform hole depth. Nor do the tines provide uniform spacing between the holes.

U.S. Pat. No. 7,293,612 relates to a Walk Aerator with Ground Following Coring Head designed to adjust the vertical position of the coring head relative to the frame in response to changes in ground contour. If the skid assembly rotates sufficiently out of its horizontal position, a pivotal connecting rod attached to the skid assembly causes a switch actuator to depress either of a pair of limit switches. Each limit switch may actuate a hydraulic cylinder to raise or lower the height of the coring head on the frame. As the coring head moves up or down, however, the tines may not be perpendicular to the ground surface.

U.S. Pat. No. 8,255,126 relates to an Aerator having Flexible Frame designed for use on sloped or undulating ground surfaces of golf courses and other turf. The aerator includes a pair of frame sections linked together at a horizontal pivot axis, one of the frame sections supporting a coring head. A ground sensor is pivotably attached to one of the frame sections so that the ground sensor may pivot in response to changes in ground slope and provide output relating to the magnitude of the change. Based on the output, a flex frame actuator pivots the pair of frame sections with respect to each other.

An aerator with a ground sensor may be calibrated before aeration begins to determine the neutral position of its ground sensor. Static calibration of the ground sensor, such as a turf guard, may occur during machine setup, before the aerator is moving or the tines are reciprocating with the coring head. For example, a static calibration routine may obtain a neutral position signal, such as a voltage signal from a potentiometer, from the ground sensor while it is on flat ground.

Once an aerator begins moving and the tines are reciprocating with the coring head, the ground sensor may encounter changes in the ground surface. For example, the ground sensor may pivot up or down, or raise and lower, if there is a slope change. Each signal from the ground sensor that is different from the static calibration's neutral position signal indicates a slope change. In response to the signals, the aerator may shift the coring head to ensure the tines penetrate to the desired coring depth and the tines are perpendicular to the ground surface. The aerator may have a vehicle control unit that stores the static calibration's neutral position signal, compares the incoming signals to the neutral signal, and commands a hydraulic cylinder or an electric or electronic actuator to move the coring head as needed.

However, the ground sensor may pivot up or down, or raise and lower, for reasons other than slope change. For example, the ground sensor may move away from the static calibration's neutral position in response to active forces of the tines reciprocating with the coring head, or active forces of the aerator traveling across the ground surface. Different turf conditions and tine configurations may have different impacts on the movement and position of the ground sensor. The ground sensor may produce position signals that are different from the static calibration's neutral position signal even without slope changes. The aerator then may move the coring head to a position that fails to provide the desired hole depth and/or does not align the tines perpendicular to the ground surface. This is because static calibration routines do not account for the active forces of aeration or the active forces of the aerator's movement over the ground surface.

In response to this problem, mechanical adjustments may be made to the coring head attachment frame in an effort to produce holes having the desired depth and angle. An aerator with active turf calibration of the ground sensor is needed that reduces or eliminates the need for these mechanical adjustments. An aerator with active turf calibration of the ground sensor is needed that may be used in various conditions with consistent results. An aerator with active turf calibration of the ground sensor is needed that allows calibration during an aeration pass. An aerator with active turf calibration of the ground sensor is needed that provides perpendicular holes, consistent depth and improved hole quality. An aerator with active turf calibration of the ground sensor is needed that provides an offset from the static calibration's neutral position.

SUMMARY OF THE INVENTION

An aerator with active turf calibration of the ground sensor calibrates an offset from the neutral position of the ground sensor with position signals from the ground sensor on a flat surface during aeration. The ground sensor provides position signals corresponding to changes in slope of a ground surface relative to a flat surface. A controller receives position signals from the ground sensor and moves a coring head in response to the position signals.

The aerator with active turf calibration of the ground sensor reduces or eliminates the need for mechanical adjustments, may be used in various conditions with consistent results, and allows calibration during an aeration pass. An aerator with active turf calibration of the ground sensor provides perpendicular holes, consistent depth and improved hole quality, and provides an offset from the static calibration's neutral position.

DESCRIPTION OF THE PREFERRED EMBODIMENT

Figure 1:
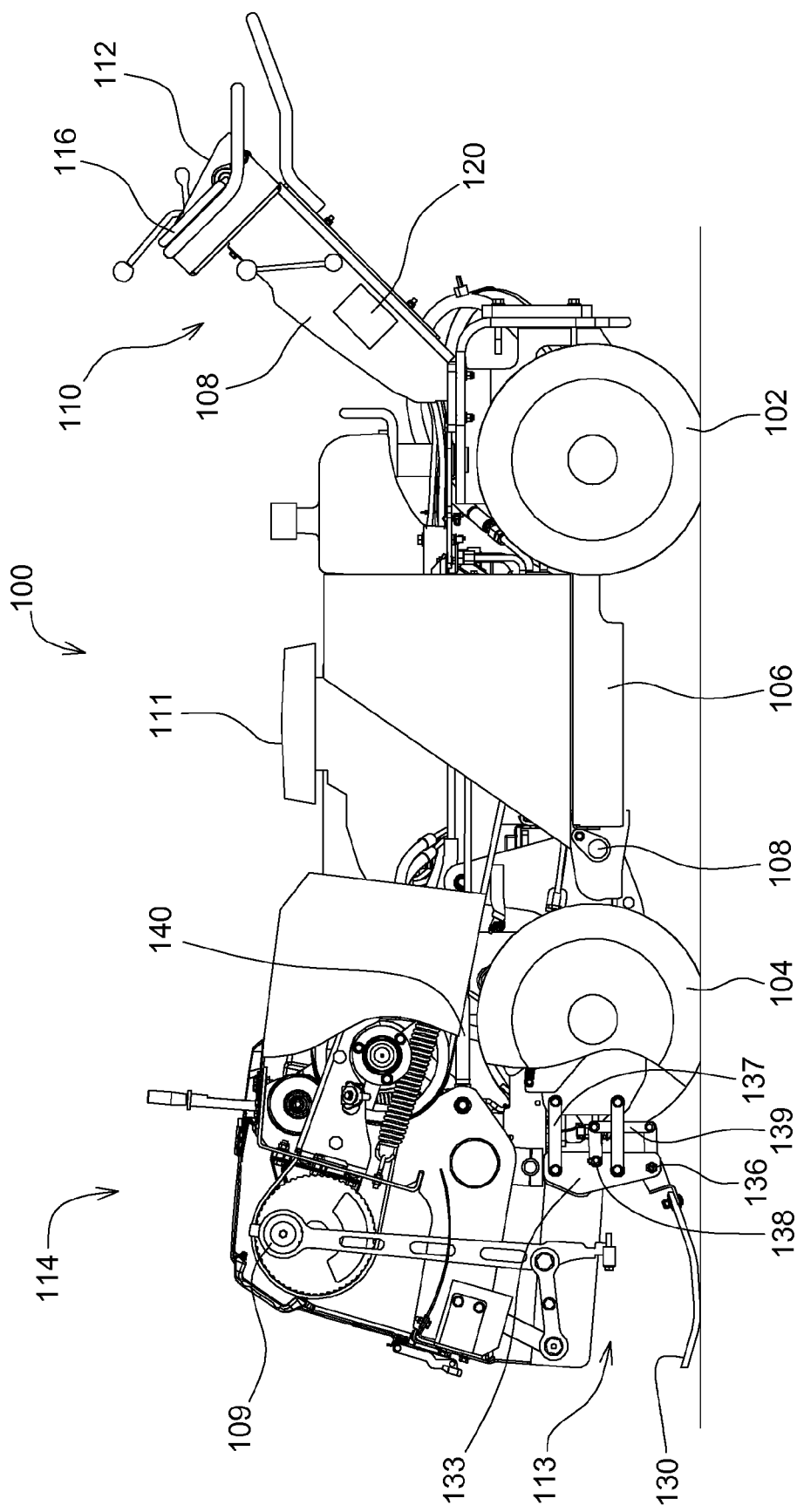
FIG. 1 is a side view of an aerator with active turf calibration of a ground sensor before offset from the static calibration neutral position, according to a preferred embodiment of the invention.
Figure 2:
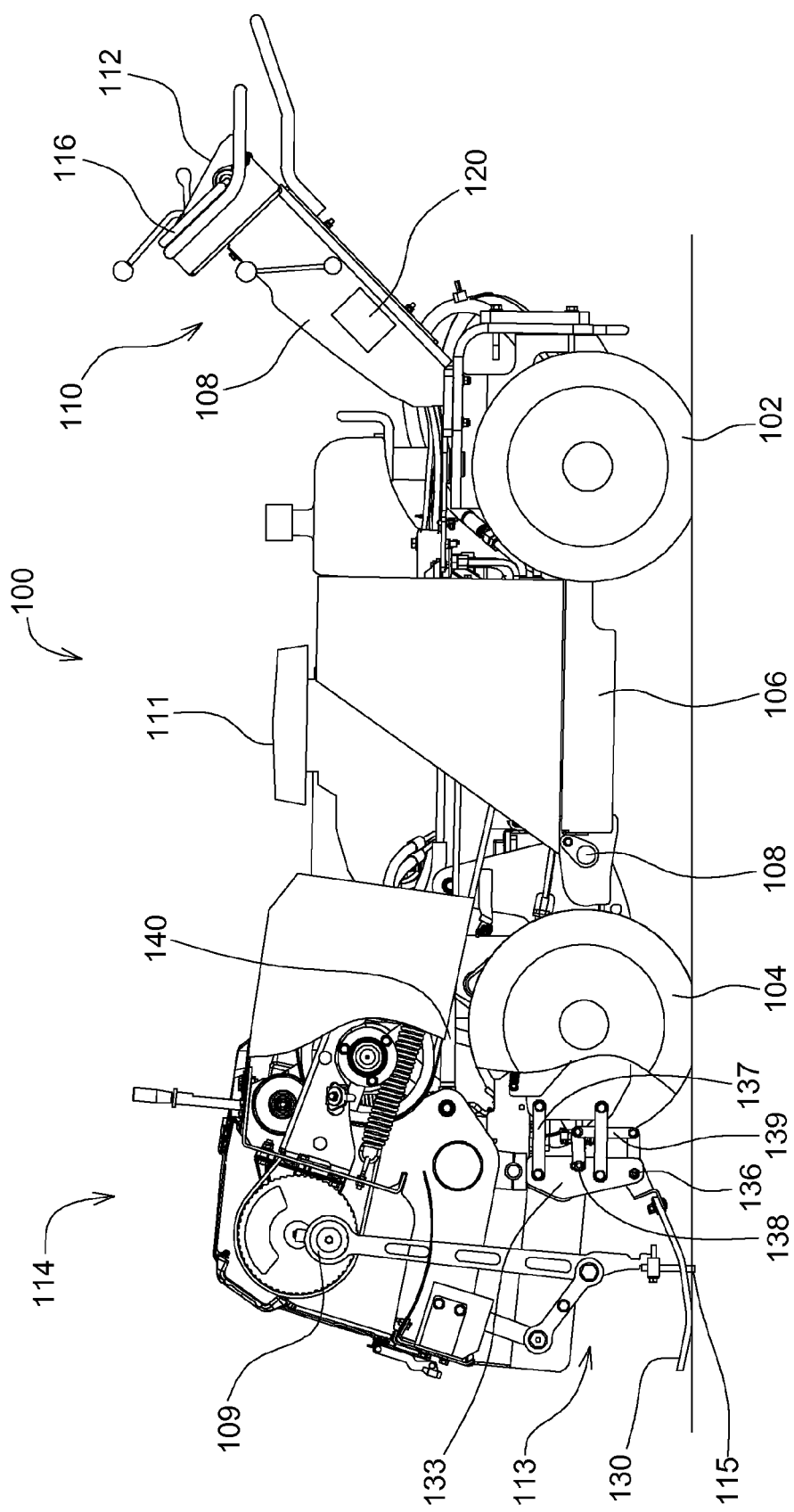
FIG. 2 is a side view of an aerator with active turf calibration of a ground sensor after offset from the static calibration neutral position, according to a preferred embodiment of the invention.

In one embodiment shown in FIGS. 1-2, walk-behind aerator 100 may be supported for movement over the ground by a single steerable wheel 102, which may or may not be driven, and a pair of driven wheels 104. Frame 106 may have a neck 108 extending upwardly therefrom, and the single steerable wheel may be carried in a pivotal yoke that can rotate about a vertical pivot axis attached to the neck. An upwardly and forwardly extending handle assembly 110 may be coupled to the pivotal yoke that carries the front wheel, and may include control panel 112. An operator may walk ahead of the aerator and steer the aerator by using the handle assembly to pivot the single steerable front wheel about the vertical pivot axis.

In one embodiment, coring head 114 may be mounted on the rear of the aerator, either behind the rear drive wheels and tires, between the rear drive wheels and tires, or adjacent the rear axle(s). The coring head may carry a plurality of tine assemblies 113 that reciprocate up and down by rotation of crankshaft 109. Each tine assembly may have a plurality of coring tines 115 that are driven into the ground and produce holes for the purpose of aerating the turf. Each tine assembly may include a rubber dampener system that absorbs the forward motion of the aerator to help improve hole quality by minimizing hole elongation.

In one embodiment, the aerator may have an internal combustion engine 111, one or more batteries, and/or any other power source that may be used to operate coring head 114 and provide traction drive for the rear wheels. The internal combustion engine may also drive an alternator to generate electric power, a mechanical or hydrostatic transmission to connect each power source to one or more of the rear wheels. In the case of a hydrostatic transmission, a pump may supply pressurized fluid to a single hydraulic motor or pair of hydraulic motors for rotating the rear wheels. If the aerator has an electric traction drive system, an electric drive motor on each rear wheel may be connected by cables to batteries or the electric power supply.

The aerator described in this application may be provided with a traction drive that can move the machine in the forward direction at a coring ground speed while the coring head is operating, or in the reverse direction while the coring head is not operating. Additionally, the traction drive can move the aerator in the forward direction at a higher transport speed while the coring head is not operating. An operator typically may walk in front of the aerator as it moves in the forward direction. However, those skilled in the art will understand that the aerator of this invention is not limited to aerators with the same forward and reverse designations used in this application, but is intended to include any other walk behind aerators.

In one embodiment, the operator may operate the traction drive to move the aerator forward or in reverse by moving traction bail 116 in either the forward or reverse direction. The traction bail may be a single lever or a pair of levers pivotably mounted to the sides of the operator controls on the handle assembly of the aerator. The traction bail may be biased to a central or neutral position when released by the operator.

In one embodiment, the aerator may include one or more ground sensors 130 that may be used to detect changes in the slope of the surface being aerated. For example, the ground sensor may be turf guards which are slotted plates that slide along the ground surface. The turf guard(s) may be attached to turf guard bracket 132 which is aligned transversely to the aerator's direction of travel and may be pivotably attached to the frame. Each turf guard may have a plurality of slots through which the hollow coring tines reciprocate to make holes in the turf. The turf guard holds the turf in place so that when the tines pull out of the ground, the turf around each hole does not lift with them. The turf guard may be spring loaded to provide positive and firm support for the tines as they pull out of the ground, and the pressure may be adjusted to lighter tension for soft conditions, or greater tension for firm conditions. The turf guard may be constructed of plastic or metal, and the bottom of the turf guard may be beveled to help slide along the ground surface as the aerator travels, without grabbing back edges of the holes.

In one embodiment, turf guard 130 and turf guard bracket 132 are pivotably mounted to sub frame 133. The turf guard sub frame 133 may be mounted using lost motion linkage 137. The linkage may be used to raise or lower the turf guard sub frame together with the coring head, so that the turf guard may be moved between a transport position and a coring position.

In one embodiment, while the turf guard is in the coring position, it pivots on axis 136 either in a first direction when encountering the slope change of a hill or rise, or in a second direction when encountering a slope change that is a dip in the ground surface. The pivot axis is horizontal and perpendicular to the direction of travel of the machine.

In one embodiment, the turf guard may be mechanically linked to potentiometer 138 that senses angular change or displacement. Alternatively, an encoder, a Hall sensor or other device that provides output relating to the angular change or displacement of the turf guard may be used. As the turf guard encounters a change in slope and pivots on axis 136, it moves the potentiometer an amount corresponding to the change in slope.

In one embodiment, the turf guard may be connected to potentiometer 138 through arms 139, and the potentiometer may provide active signals regarding the slope change to aerator's electronic control unit 120. The active signals may be based on the angular position or inclination of the turf guard, which may be provided to the vehicle control unit at regular intervals such as every 10 milliseconds. The angular position of inclination may be converted to a digital quantity in counts or other units.

Alternatively, instead of a potentiometer linked to the turf guard, the ground sensor may be attached to the same portion of the frame as the coring head, but not necessarily attached to the coring head. Thus, the ground sensor may be any ground following device attached to the frame of the aerator for sensing changes in slope of the surface being aerated. For example, the ground sensor may include a ground following roller attached to the aerator, instead of a sliding turf guard.

In one embodiment, aerator control unit 120 may use input signals from the ground sensor to determine how much to move or pivot the coring head. More specifically, the control unit may include a microprocessor that may be programmed and configured to shift the coring head's position sufficiently to assure that the coring tines enter and exit the ground perpendicular to the ground surface, at a desired depth, regardless of the change in slope of the ground surface.

In one embodiment, aerator control unit 120 may provide commands to flex the aerator frame as shown and described in U.S. Pat. No. 8,255,126. The commands from the vehicle control unit are based on ground sensor inputs as it encounters a rise or fall of the ground surface. The frame flex actuator may be a hydraulic cylinder which may extend and retract between the first and second frame sections, or an electric actuator that may flex the first and second frame sections with respect to each other. The frame flex actuator may flex the frame about horizontal pivot axis 108 that is transverse to the flexible frame aerator's direction of travel. Alternatively, the aerator control unit may provide commands to raise or lower the coring head, or change the pivot head angle using hydraulic cylinder 140.

In one embodiment, the aerator may include a hydraulic lift and lower system to raise the coring head to a transport position and lower the coring head to an operating or coring position. FIGS. 1 and 2 show the coring head in an operating or coring position. An operator may actuate a switch on control panel 112 to raise and lower the coring head and/or engage a clutch for the traction drive. Optionally, an electro hydraulic pump may be provided on the aerator to raise and lower the coring head using electric power.

FIG. 1 shows aerator 100 with active turf calibration of ground sensor 130 before offset from the static calibration neutral position. Static calibration is intended to help ensure the tines are perpendicular to the ground surface on flat ground, but is done during machine setup with the tines removed, before the aerator is moving and before the tines are reciprocating with the coring head. For example, a static calibration routine may obtain a neutral position signal, such as a voltage signal from potentiometer 138, from the ground sensor while it is on flat ground.

FIG. 2 shows aerator 100 with active turf calibration of ground sensor 130 after offset from the static calibration neutral position. Active turf calibration of the ground sensor may be done on a flat surface during aeration while the aerator is moving and while the tines are reciprocating with the coring head. As a result of the active forces of aeration and machine travel, ground sensor 130 may not be in the same neutral position as during static calibration. For example, during active turf calibration the coring head may be slightly raised and the ground sensor lower than in the static calibration neutral position. As a result of active turf calibration, an offset may be provided to the aerator's control unit which may be added or subtracted from the static calibration's neutral position. The control unit may use the static calibration's neutral position along with the offset to move the coring head to achieve the desired coring depth and perpendicular tine angle.

Figure 3:
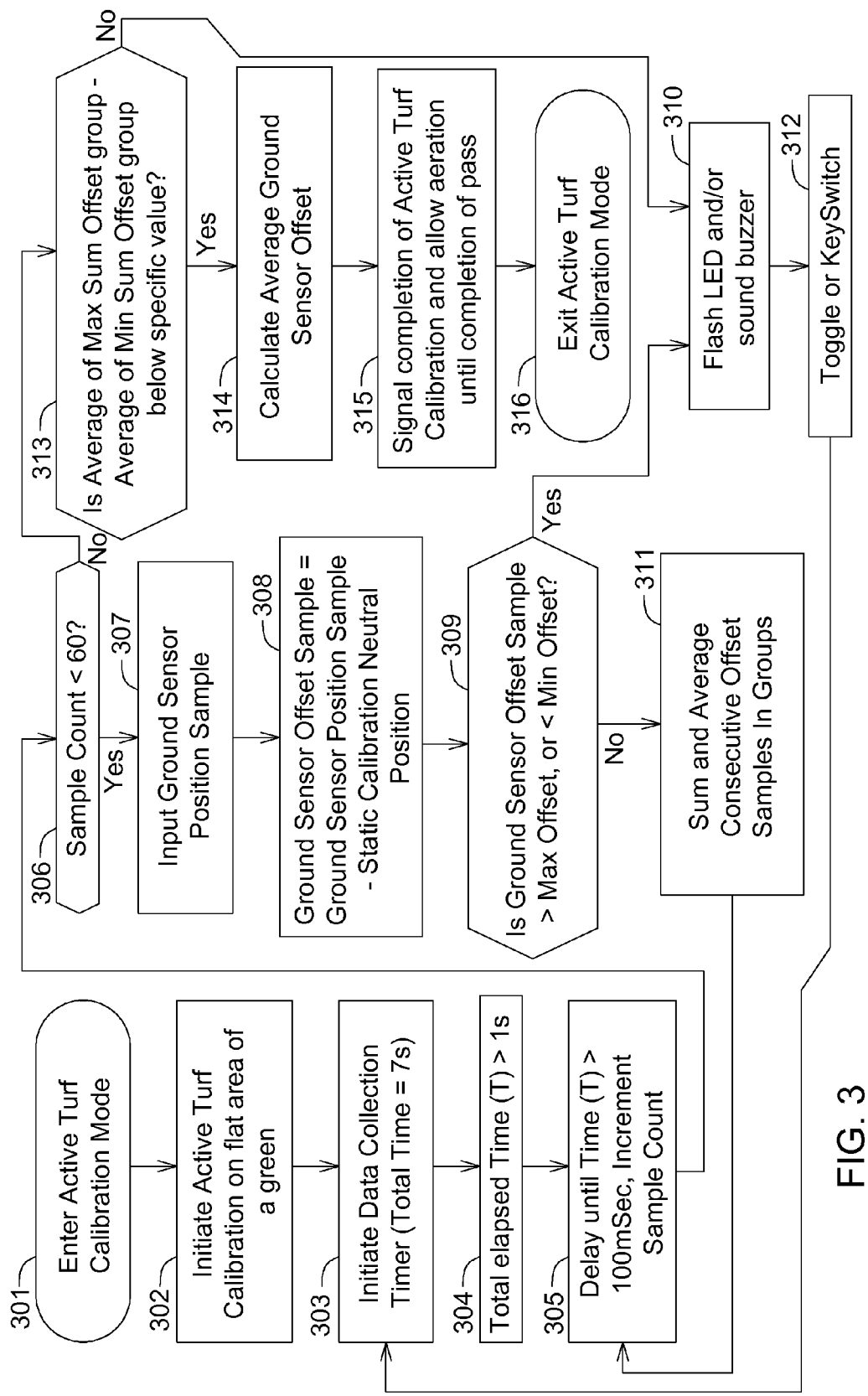
FIG. 3 is a logic diagram of an aerator with active turf calibration of the ground sensor, according to a preferred embodiment of the invention.

FIG. 3 shows an embodiment of an active turf calibration routine according to the present invention. The aerator's electronic control unit may perform the logic steps using a microprocessor programmed with software as will be understood by those skilled in the art. In block 301, the operator may enter a key sequence and/or actuate a switch on the aerator control panel to enter the Active Turf calibration Mode. In block 302, the operator may actuate another switch or control on the aerator control panel to lower the coring head and engage the traction drive clutch on a flat area of ground to begin aeration in the Active Turf Calibration Mode. In block 303, the control unit of the aerator may initiate a data collection timer used for active turf calibration. For example, the control unit timer may set an active turf calibration time limit such as 7 seconds. In block 304, the control unit may specify a time delay such as 1 second before starting to collect sample data or signals for the position of the ground sensor.

In one embodiment, in block 305, the aerator control unit may increment a sample counter and set a time delay such as 100 msec between each Ground Sensor Position Sample. In block 306, the control unit may determine if the total sample count is less than a total such as 60, or 10 samples per second during 6 seconds of sample data collection. If the sample count has not reached the limit, in block 307 the control unit may obtain a Ground Sensor Position Sample which are signals indicating the actual position of the ground sensor. For example, each Ground Sensor Position Sample may be a signal or voltage from a potentiometer connected to the ground sensor. As stated above, each Ground Sensor Position Sample is obtained while the aerator is moving on flat ground and the tines are reciprocating with the coring head. In block 308, the control unit may determine and save a Ground Sensor Offset Sample for each Ground Sensor Position Sample. The Ground Sensor Offset Sample is the difference between the Ground Sensor Position Sample and the ground sensor static calibration neutral position.

In one embodiment, in block 309 the aerator control unit may check the Ground Sensor Offset Sample for data or signal errors. For example, the control unit may determine if each Ground Sensor Offset Sample is greater than a maximum offset or less than a minimum offset. If a Ground Sensor Offset Sample is outside the acceptable offset range, the controller may actuate an audible and/or visual alarm in block 310 so that the operator may terminate or restart Active Turf Calibration in block 312 with a key switch or toggle. Restarting Active Turf Calibration may return the controller logic to block 303.

In one embodiment, after the aerator controller obtains and checks each Ground Sensor Offset Sample for errors in block 309, and adds the sample to a group of consecutive samples in block 311, the controller then may increment the sample counter in block 305 and wait 100 msec, to obtain the next Ground Sensor Position Sample in block 307.

In one embodiment, the aerator control unit may check if the ground surface was sufficiently flat for Active Turf Calibration. This may be done by combining consecutive Ground Sensor Offset Samples in several groups, summing the groups and comparing the group averages. For example, in block 311 the controller may sum several groups of consecutive Ground Sensor Offset Samples, and determine the average each group. More specifically, the controller may sum Ground Sensor Offset Samples in six groups consisting of 10 consecutive offset samples each, and calculate the average of each group. After all of the Ground Sensor Offset Samples are collected, in block 313 the controller may select the offset groups having the maximum and minimum averages, and determine if the difference between the maximum and minimum is less than a specified value. If the difference is not below the specified value, the controller may actuate an audible and/or visual alarm in block 310 indicating the ground surface was not flat enough for Active Turf Calibration.

In one embodiment, the controller may calculate and save the Average Ground Sensor Offset from all the samples in block 314. The controller also may add or subtract the Average Ground Sensor Offset from the static calibration neutral position value. In block 315, the controller may signal completion of Active Turf Calibration and allow aeration to continue until the completion of the pass across the green. In block 316, the operator may raise the coring head and the aerator may exit the Active Turf Calibration Mode. The operator then may enter the Aeration Mode by using a key sequence and/or operating a switch on the control panel.

Having described the preferred embodiment, it will become apparent that various modifications can be made without departing from the scope of the invention as defined in the accompanying claims.

The invention claimed is:

1. An aerator with active turf calibration of a ground sensor, comprising:
   a ground sensor providing signals to a controller relating to slope of a ground surface in a direction of travel;
   the controller adjusting the position of a coring head following the ground sensor to maintain the coring head at a position perpendicular to the ground surface based on the signals from the ground sensor;
   calibrating the ground sensor by collecting a plurality of offset samples, each sample generated by comparing a neutral position of the ground sensor while operating the coring head to aerate a ground surface by reciprocally driving a plurality of tines into the surface, to the neutral position of the ground sensor on the same ground surface when the coring head is not operating; and
   checking if the ground surface is sufficiently flat for active turf calibration by determining if a plurality of groups of offset samples are within a specified value of each other.

2. The aerator with active turf calibration of a ground sensor of claim 1 wherein the calibration is based on a plurality of sample signals obtained from the ground sensor on a flat surface during aeration.

3. The aerator with active turf calibration of a ground sensor of claim 1 wherein the controller adjusts the position of the coring head by flexing a frame of the aerator.

4. The aerator with active turf calibration of a ground sensor of claim 1 further comprising a potentiometer that provides signals to the controller in response to pivotal movement of the ground sensor.

5. An aerator with active turf calibration of a ground sensor of claim 1 wherein the ground sensor is a turf guard.

6. An aerator with active turf calibration of a ground sensor, comprising:
   a ground sensor pivotably mounted to the aerator and providing position signals corresponding to slope of a ground surface relative to a flat surface in a direction of travel;
   a controller receiving the position signals from the ground sensor and moving a coring head to a position perpendicular to the ground sensor in response to the position signals;
   the controller calibrating an offset from the neutral position of the ground sensor by collecting offset samples made by comparing position signals from the ground sensor on a ground surface during aeration, to position signals from the ground sensor before aeration; and
   the controller checking if the ground surface is flat by determining if an average of a first group of offset samples is within a specified value of an average of a second group of offset samples.

7. An aerator with active turf calibration of a ground sensor of claim 6 wherein the controller calculates an average of the offset from the neutral position of the ground sensor.

8. An aerator with active turf calibration of a ground sensor, comprising:
   a controller saving a static calibration neutral position of a ground sensor on a ground surface before aeration;
   the ground sensor providing a plurality of sample signals to the controller corresponding to the position of the ground sensor during aeration on the ground surface in the direction of travel, and positioning a coring head perpendicular to the ground sensor;
   the controller determining an offset from the static calibration neutral position by comparing the plurality of sample signals to the static calibration neutral position; and
   the controller checking if the ground surface is sufficiently flat for active turf calibration by comparing a plurality of groups of sample signals to each other.

9. The aerator with active turf calibration of a ground sensor of claim 8, wherein the controller provides signals to a coring head to move in response to signals indicating the ground sensor is outside of the static calibration position plus the offset.

10. The aerator with active turf calibration of a ground sensor of claim 9, further comprising a flexible frame of the aerator that moves the coring head.

* * * * *